US007502821B2

(12) United States Patent
Heymann

(10) Patent No.: US 7,502,821 B2
(45) Date of Patent: Mar. 10, 2009

(54) ENHANCED INTERNET SESSION MANAGEMENT PROTOCOL

(75) Inventor: Juergen Heymann, Leimen (DE)

(73) Assignee: SAP AG, Waldorf (DE)

( * ) Notice: Subject to any disclaimer, the term of this patent is extended or adjusted under 35 U.S.C. 154(b) by 678 days.

(21) Appl. No.: 11/016,259

(22) Filed: Dec. 16, 2004

(65) Prior Publication Data

US 2006/0136592 A1   Jun. 22, 2006

(51) Int. Cl.
*G06F 15/16*   (2006.01)
(52) U.S. Cl. ........................ 709/203; 709/229
(58) Field of Classification Search .................. 709/203
See application file for complete search history.

(56) References Cited

U.S. PATENT DOCUMENTS 7,343,486 B1 *  3/2008  McCarty et al. ............. 713/155

2002/0029269 A1 *  3/2002  McCarty et al. ............. 709/225
2002/0165971 A1 * 11/2002  Baron ......................... 709/228
2003/0009562 A1 *  1/2003  Heymann et al. ........... 709/227
2004/0049589 A1 *  3/2004  Papanikolaou et al. ...... 709/229
2005/0021694 A1 *  1/2005  Yuan ........................... 709/220

* cited by examiner

*Primary Examiner*—Jason D Cardone
*Assistant Examiner*—Nicholas Taylor
(74) *Attorney, Agent, or Firm*—Mintz, Levin, Cohn, Ferris, Glovsky & Popeo, P.C.

(57) ABSTRACT

A system and method of managing a client/server session is disclosed, in which a client uses a browser to request content from a content server. The content associated with the session is received at the browser along with a session termination URL from the content server, the content and session termination URL being passed to a portal page received at the browser from a portal server. A request for a new session is sent from the browser to the portal server, the request including the session termination URL. The session termination URL is sent by the portal server to the content server to terminate the session.

14 Claims, 3 Drawing Sheets

ENHANCED INTERNET SESSION MANAGEMENT PROTOCOL

BACKGROUND

This document relates to Session Management of Internet Protocol (IP) communication sessions. Enterprises are increasingly using portals for collaborative internet processes. For example, Application Service Providers (ASPs) applications and content through a portal to a client using a standard internet browser. One goal is to no longer have dedicated client software installed on each client computer of an enterprise or group or related users.

In such a scenario, a client browser is used to access an application, i.e. the client browser sends one or more requests to a server invoking that application and performing certain steps within the application. The application needs certain resources (memory, connections, data locks, etc.) that it must acquire to service the requests of the user. Some or all of these resources must be held by the server while the server/application is waiting for subsequent requests from the user. This is known as "server state," or more specifically, a "session" or "user session" (i.e. holding the data for the particular user).

The standard internet protocol for communication between a client browser and a server or portal is the hypertext transport protocol (HTTP). HTTP is stateless/connectionless, meaning there is usually no "leaving" the application, and the user can actually just close the browser without the server noticing. The concepts herein are described primarily in the context of using a portal, where a user navigates to portal pages to access applications that are generally started via URL in an IFRAME. In this context, "leaving the application" simply means leaving the portal page that contains or which started that application. Note however that the concept is not necessarily limited to the portal case.

When an application is accessed from a server, the server must keep the resources it holds ready for the particular user session, not knowing if the user will "return," and instead only wait for a timeout. Acquiring such resources on the server, or even a write lock as is typical for complex change operations, is very costly and can lead to unacceptable results. Thus a mechanism is needed to notify the server when the user leaves the application, or even when the user just closes the browser.

One such mechanism includes the server sending a special Session Termination URL (STU) embedded in a response when the server holds state and/or resources that must be freed when the user "leaves" content or an application provided by the server. The STU is a termination URL that the server provides to terminate the particular session of the particular user. When the user leaves the portal page, the STU is sent to the server so that the server can immediately terminate the user session and release all resources held for that application for that user. This STU is picked up by a Session Termination Agent (STA), a script waiting in the browser and part of the portal, and then remembered within the STA. The STA is located in a frame outside of the frame that contains the application.

Two occurrences are crucial to effective session management according to the mechanism described above: first, the server sending the STU as part of the response and the STA waiting in the browser that will pick up the STU and remember it; and second, the client recognizing that the current page has been left, which triggers sending the STU. In the mechanism described above, the second step above can be performed by detecting a "page unload" event raised by the browser. This has the advantage that three kinds of "page left" cases associated with a portal can be captured with one technology: (1) The user moves to another portal page (by portal navigation), (2) the user selects a browser favorite and displaces the portal (including the application), and (3) the user simply closes the browser.

One disadvantage is that for each portal page request (i.e. a request to go to a new page), there is also a second request from the STA in the browser if the last page contained an application that needs a session termination. This means that for heavy use of server session termination, for each portal page request there are two requests coming from the browser. The first is a request to a content server to terminate the session (STA sends the STU it has stored), and the second is a request to the portal server for the "next page." Since the browser has a limitation of bandwidth and a number of connections it can use, the termination request effectively delays the content of that "next page."

SUMMARY

A system and method of managing a client/server session is disclosed, in which a client uses a browser to request content from a content server. The content associated with the session is received at the browser along with a session termination URL from the content server, the content and session termination URL being passed to a portal page received at the browser from a portal server. A request for a new session is sent from the browser to the portal server, the request including the session termination URL. The session termination URL is sent by the portal server to the content server to terminate the session.

In accordance with an embodiment, a method is described for managing a session between a browser, a portal server that provides a portal page to the browser, and a content server that provides content to the portal page. The method includes receiving, at the portal server, a request for a new portal page by the browser. The method further includes sending, by the portal server to the content server, a session termination URL to terminate the session.

In accordance with another embodiment, a session management system includes a browser, a portal server that provides a portal page to the browser, and a content server that provides content to the portal page. In an exemplary implementation, the portal server is configured to receive a request for a new portal page by the browser, and in response, to send a session termination URL to terminate the session.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a session management system and method, enabling notification to the server when a user leaves a session-based application, or when the user closes a browser through which the application is retrieved from the server. Instead of sending a termination request STU from the browser at the same time as a page request, only the page request is sent to the portal server, and the portal server sends the STU to the application server. Accordingly, all termination requests come from the portal server. Since browsers can handle only two requests at the same time, the STU from the browser side is no longer needed, which frees up the communication for earlier and faster loading of content from the portal server to the browser. Thus, the STU is passed to the portal server as a parameter with the page request for the new page.

Termination of a session can also occur where the user selects anything from a "favorites" list such as a bookmark or the like stored browser, which displaces the portal framework page, or if the browser application is simply closed on the client. These termination cases are still handled by the "unload" mechanism at the framework level.

Figure 1:
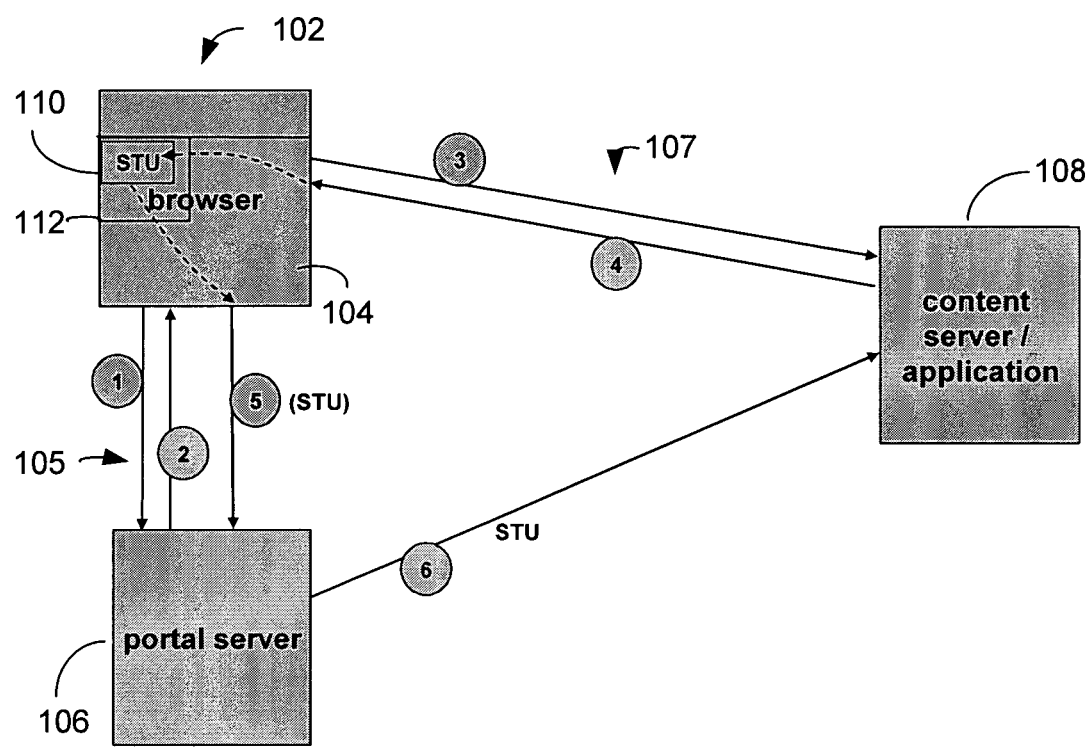
FIG. 1 shows a system for executing an internet session in accordance with an exemplary embodiment.

FIG. 1 shows an enterprise communication system 100 for executing a web application session. The system includes a client 102 that uses a browser 104 to communicate with a portal server 106 via connection 105 and an application/content server 108 (hereafter called a "content server") via connection 107. The content server 108 can be part of an ASP. The portal server 106 serves portal pages to the browser 104 in the client 102, such as enterprise and collaboration tools. The portal server 106 and content server 108 may be part of the same server computer, or located in separate computers.

In accordance with an embodiment, the browser 104 is used to request a page from the portal server 106 over connection 105, illustrated as communication (1). The portal server 106 responds by sending the requested page, at (2). The page contains IFRAMEs with one or more URLs, generated by the portal server 106, that point to the designated content server 108. At least one URL to the content server 108 is requested from the browser 104, at (3) over connection 107.

The content server 108 responds with the content and/or application corresponding to the requested URL, at (4). Within the response, a session termination URL (STU) 110 for this application session is included and passed to the session termination agent (STA) 112 residing within the portal page in the browser 104, which was generated by the portal server 106 as part of the page response at (2). A new page is requested from the portal server 106, at this point, the user is "leaving" the first application and likely the associated session. The STU 110 that was previously received by the STA 112 is now passed as an argument to the page request URL (5) generated by the portal server 106. Independently from the page response, the portal server 106 sends the STU 110 to the content server 108. Accordingly, the browser can now use both connections, to the portal server 106 and to the content server 108, to receive content and information. A page can contain multiple IFRAMES with content from multiple content servers. This results in multiple STUs accumulated by the STA for one page, and also these multiple STUs sent as arguments to the request for the 'next page'.

Accordingly, the STU 110 is passed by the browser as a URL parameter to the request for the next page, and the trigger representing "user leaves page" comes not by a page unload event of the browser 104, but by information representing "next page requested." This enables the STU 110 to be sent from the portal server 106, freeing the browser 104 to use both connections 105 and 107 to load content.

Figure 2:
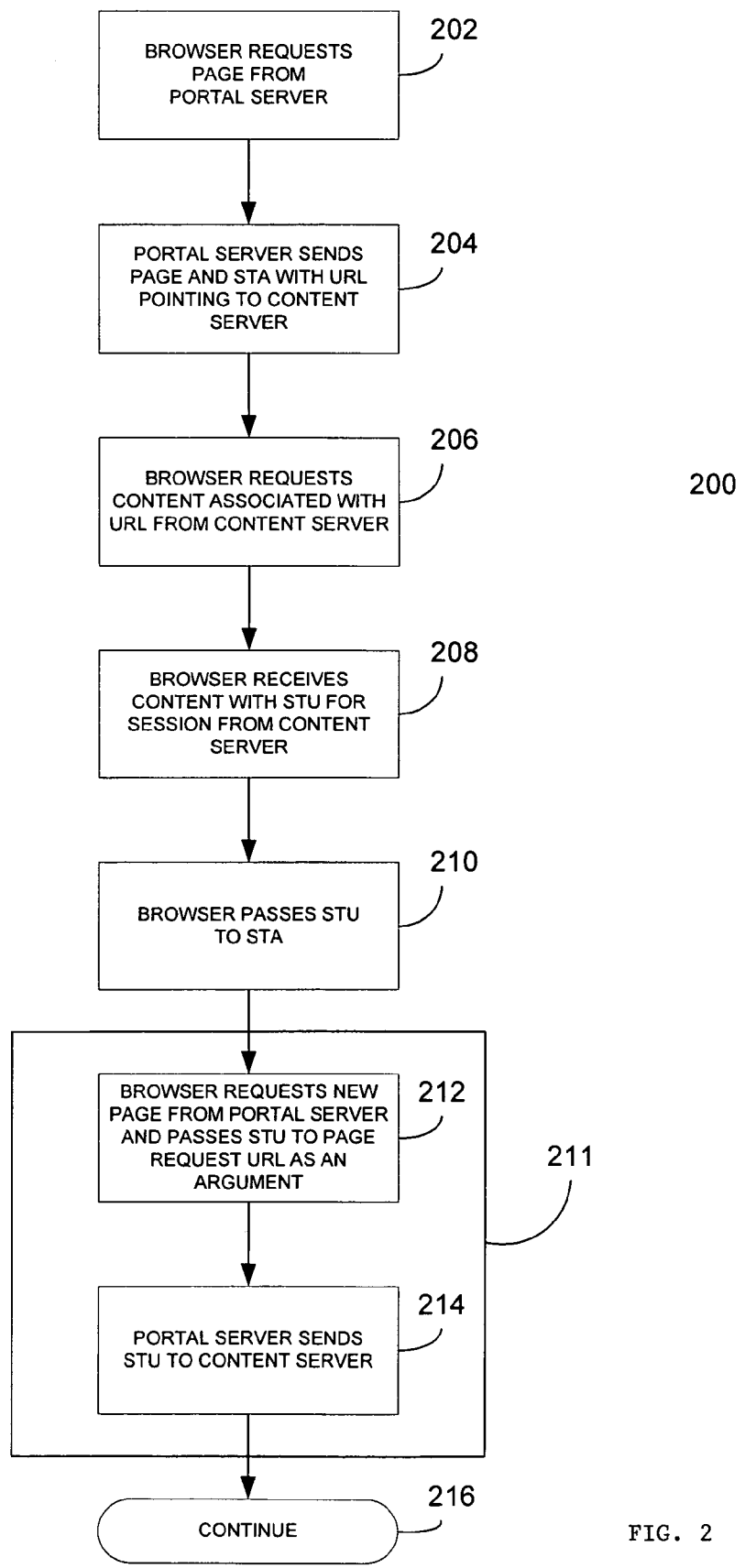
FIG. 2 is a flowchart of an internet session and a technique for managing the session.

FIG. 2 shows a method 200 for managing an internet session in accordance with an exemplary embodiment. At step 202, a browser requests a portal page from a portal server. The portal page can include any information, such as collaboration tools, or can be a request for a web-based application. At step 204, the portal server sends the requested portal page and an associated STA for the browser, along with at least one URL for the appropriate page in a content server. At step 206, the browser requests the content from the content server associated with the URL. The content can be an application or data used by the application. At step 208 the browser receives the requested content with an STU for the session from the content server. At step 210, the browser passes the STU to the previously generated and received STA in the browser.

In accordance with a specific exemplary embodiment of a session management method 211, the browser can request a new page from the portal server at step 212. The browser passes the STU to the new page request URL as an argument, or type of parameter of the URL. At step 214, the portal server sends the STU to the content server on a connection between the portal server and the content server, independent from the browser. At step 216, the browser continues sending requests and receiving content and data from both the portal server and content server, making more efficient use of its connections with the portal server and content server.

Figure 3:
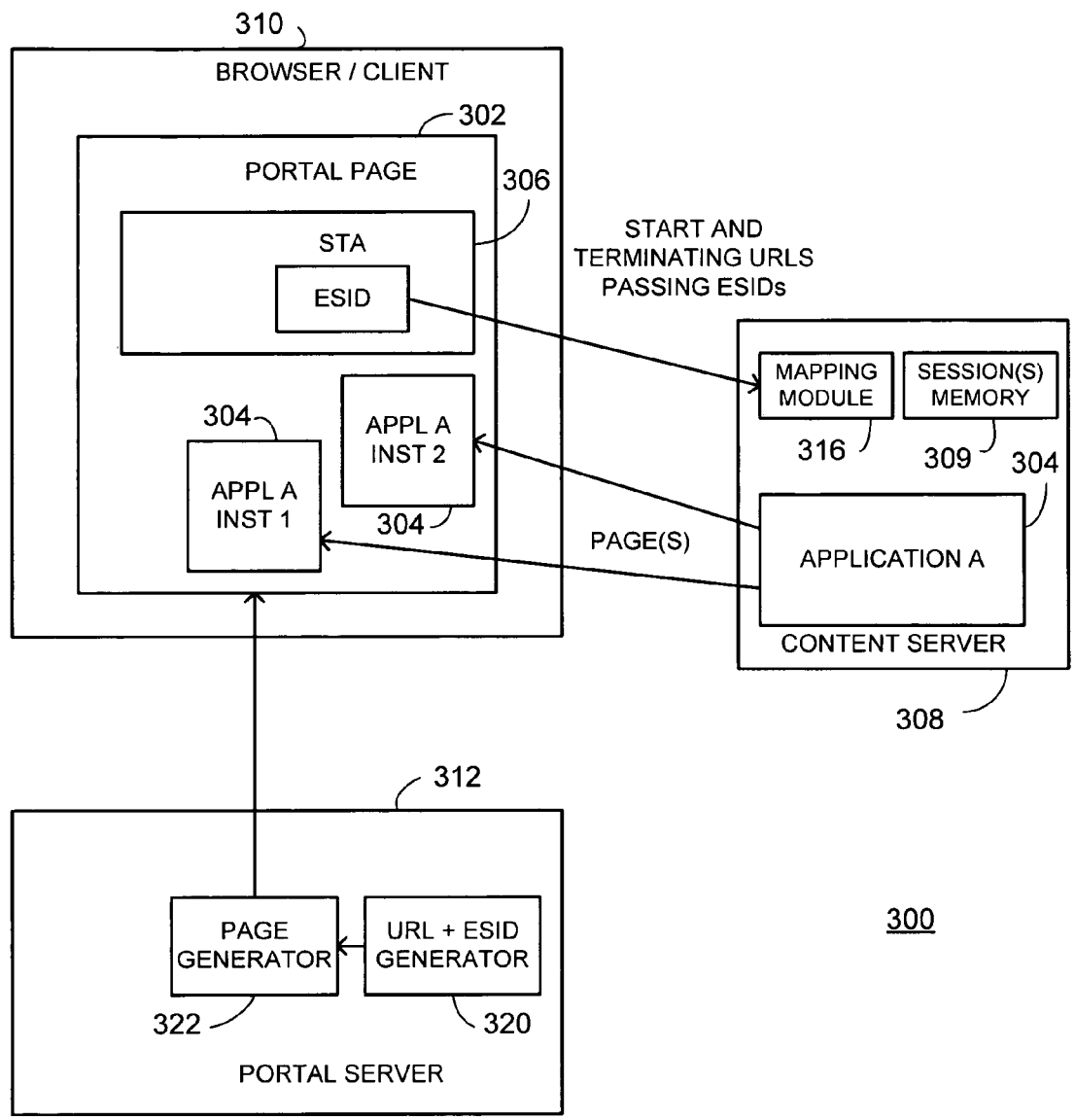
FIG. 3 shows a system for executing a web application session in accordance with an alternative embodiment.

FIG. 3 shows an enterprise communication system 300 executing a web application session in accordance with an alternative embodiment. System 300 includes a portal page 302 generated by a page generator 322 and delivered by a portal server 312. The portal page 302 displays one or more instances of an application 304, i.e. one or more web pages and their content, served from content server 308.

Each instance of the application 304 is ultimately displayed in a browser operating on a client 310. The application 304 of the web application session 300 can also be displayed simultaneously with other web content, such as content from a local client application or from another content or application server. The portal page 302 includes an STA 306 for managing each application session based on application session information. The STA 306 can be page-level script code.

In order for a user to visit a previously-viewed page, the server platform 308 keeps some "state" of a session, i.e. information relating to the instance of the application to allow a user to visit a previously-viewed page. In one embodiment, the server platform 308 includes a session memory 309 for storing a state of a session of an application that a user has left. The state includes an instance identifier, which further includes a page identifier of each page of the session. An instance identifier can be stored for each page visited in the session, thereby providing a memory having a number of instance identifiers. Thus, the server state knows the "current page" of the session.

The portal server 312 also includes a URL generator 320. As a user navigates within a session and out of an application, the URL generator 320 of the portal server 312 provides an "External Session ID" (ESID). The ESID is an argument that is different between two instances of the application (on the same page), and leads to different/independent sessions in the server. The URL to revisit a page identifies the application and the ESID that identifies the instance of the application, but otherwise has no information about the "target page." The content server 308 stores information about which page to show and where the session is. Thus, when the user returns to the same page, the ESIDs are passed again with the individual application requests, and the content server 308 can then logically reconnect to the proper session and allow the user to continue.

When a user wants to revisit a session, and have a page of the session displayed in the same state as when they left it, the portal page 302 will send to the server platform 308 a start URL for the page requested, as well as an ESID associated with the requested page.

Using the ESID, the view state is saved when the user leaves the page, and is found again when the user revisits. The ESID can be formatted to include a page identifier (pageID), except when an ESID is shared. Since a user can use more than one window either through the portal page 302 or on the browser/client 310, the ESID may also contain a window identifier (windowID). Alternatively, ESIDs can be specified that lead to sessions in which the same page is shared by many portal pages 302. Accordingly, the same ESID can be specified from different places, and on multiple paths.

ESIDs are specified as page properties, and can be passed via URL to the server platform 308. When a requested application does not include an ESID, the application simply starts fresh each time it is requested. When the server platform 308 receives the ESID and start URL, a mapping module 316 maps the ESID to particular session, i.e. it checks whether a corresponding ESID already has been stored in the session memory 309. If the ESID does not exist, the server platform 308 creates a new instance of the session of the requested application 304. If the ESID does exist, the server platform 108 starts the application 104 and passes it in the saved state to the portal page 102.

The ESID is computed and defined by the portal server 312 and passed along with a request that starts an application on the content server 308. This ESID identifies the "instance/session" on the content server 308 for the particular session. One use of the ESID is to manage multiple backend sessions and allow a user to come back to them, known as "back enabling." The ESID also simplifies session management. The content server 308 does not have to send a termination URL at all since the same ESID is simply used again later as an argument to a single defined termination URL for that content server 308. The server then closes the session with the given ESID.

From the portal's point of view, the information that needs to be known is what ESIDs were used on the page being currently displayed, which information is kept in the portal server 312. Then, the information/event "new page request" can trigger the server session termination (i.e. sending the STU). Thus, on the portal server 312 side, the page renderer simply informs the session manager 306 each time a new page is requested, and the session manager 306 will send the STUs that contain the ESIDs directly from the portal server 312. Thus, the need to have an STA, to receive the STU, and to pass the STU along with the request for the next page are avoided.

Accordingly, the event defining "terminate a current session" is not passed by a separate URL from the browser 310 (triggered by "unload" in an IFRAME), but triggered by the page renderer which is asked for the "next page" and managed within the portal server 312.

Although a few embodiments have been described in detail above, other modifications are possible. The logic flow depicted in FIG. 2 does not necessarily require the particular order shown to achieve desirable results. Other embodiments may be within the scope of the following claims.

The invention claimed is:

1. A computer-implemented method comprising:
    sending a first portal page and a session termination agent from a portal server to a browser via a first connection in response to a request for the first portal page received from the browser at the portal server via the first connection, the first portal page comprising a content URL that designates content to be sent from a content server to the portal page loaded in the browser as part of a session, the content server sending the content and a session termination URL to the browser via a second connection between the browser and the content server, the session termination agent in the browser receiving the session termination URL;
    receiving a new request for a new portal page from the browser at the portal server via the first connection, the request comprising a new portal page request URI. and the session termination URL;
    sending the session termination URL from the portal server to the content server via a third connection between the portal server and the content server that is independent of the first and the second connections, the session termination URL causing the content server to terminate the session without impacting either of the first connection between the browser and the portal server or the second connection between the browser and the content server.

2. A method in accordance with claim 1, further comprising sending the new portal page to the browser from the portal server via the first connection in response to the new request.

3. A method in accordance with claim 1, wherein the session termination URL is sent from the browser to the portal server as a passed parameter within the new portal page request URL.

4. A method in accordance with claim 2, further comprising receiving, by the content server, a new content URL from the browser via the second connection, the new content URL.

5. A method in accordance with claim 4, further comprising sending, by the content server, new content to the browser in response to receiving the request for new content.

6. A method in accordance with claim 1, further comprising establishing the session.

7. A method in accordance with claim 6, wherein establishing the session further includes:
    generating, by the portal server, the session termination agent.

8. A method in accordance with claim 7, further comprising receiving, by the portal server, a request for the first portal page from the browser to begin the session.

9. A session management system, comprising:
    a browser operating in a client machine;
    a portal server that provides a first portal page and a session termination agent to the browser via a first connection between the portal server arid the client machine in response to a request for the first portal page received from the browser via the first connection, the first portal page comprising a content URL that designates content to be accessed via the first portal page, the browser loading the first portal page to establish a session; and
    a content server that provides the content and a session termination URL to the first portal page in the browser via a second connection between the content server and the client machine after the browser sends the content URL to the content server via the second connection,
    wherein the portal server receives a new request for a new portal page by the browser via the first connection, the new request comprising the session termination LJRL, and in response, sends the session termination URL to the content server via a third connection to terminate the session, the session termination URL causing the content server to terminate the session without impacting either of the first connection between the browser and the portal server or the second connection between the browser and the content server.

10. A system in accordance with claim 9, wherein the portal server further generates and sends a response to the browser via the first connection in response to the request for the first portal page, the response including the first portal page, a session termination agent, and at least one content URL for the browser.

11. A method of managing a client/server session, wherein a client uses a browser to request content from a content server, the method comprising:

receiving the content along with a session termination URL at the browser from the content server via a second connection between the browser and the content server, the content and session termination URL being passed to a first portal page received at the browser from a portal server via a first connection between the browser and the portal server in response to a first request for first portal page; and sending a new request for a new session from the browser to the portal server via the first connection, the request including the session termination URL, wherein the portal server passes the session termination URL to the content server via a third connection between the portal sewer and the content server to terminate the session, the session termination URL causing the content server to terminate the session without impacting either of the first connection between the browser and the portal server or the second connection between the browser and the content server.

12. A method in accordance with claim 11, further comprising sending the first request for the first portal page to the portal server to begin the session.

13. A method in accordance with claim 12, further comprising receiving the first portal page from the portal server based on the first request for the first portal page.

14. A method in accordance with claim 11, wherein the first portal page is received with a content URL for content associated with the request for the portal page, the content URL representing a page in the content server that is associated with the session.

* * * * *

UNITED STATES PATENT AND TRADEMARK OFFICE
CERTIFICATE OF CORRECTION

PATENT NO. : 7,502,821 B2　　　　　　　　　　　　　　　　　　　　　　　Page 1 of 1
APPLICATION NO. : 11/016259
DATED : March 10, 2009
INVENTOR(S) : Juergen Heymann It is certified that error appears in the above-identified patent and that said Letters Patent is hereby corrected as shown below:

Item [73] please add the following on the Title page of the patent:

Please correct the spelling of the Assignee Residence City from "Waldorf" to "Walldorf"

In claim 1, at line 8 of column 6:

"request comprising a new portal page request URI. and" should instead read "request comprising a new portal page request URL and"

In claim 9, at line 58 of column 6:

"new request comprising the session termination LJRL," should instead read "new request comprising the session termination URL,"

Signed and Sealed this

Ninth Day of June, 2009

JOHN DOLL
*Acting Director of the United States Patent and Trademark Office*

UNITED STATES PATENT AND TRADEMARK OFFICE
CERTIFICATE OF CORRECTION

PATENT NO.        : 7,502,821 B2                                          Page 1 of 1
APPLICATION NO.   : 11/016259
DATED             : March 10, 2009
INVENTOR(S)       : Juergen Heymann It is certified that error appears in the above-identified patent and that said Letters Patent is hereby corrected as shown below:

In claim 4, at line 28 of column 6:

-- "the browser via the second connection, the new content URL." should instead read "the browser via the second connection."

In claim 9, at line 45 of column 6:

-- "between the portal server arid the client machine in" should instead read "between the portal server and the client machine in"

Signed and Sealed this

Seventh Day of December, 2010

David J. Kappos
*Director of the United States Patent and Trademark Office*